United States Patent [19]

Gary

[11] Patent Number: 4,966,344
[45] Date of Patent: Oct. 30, 1990

[54] PLASTIC ORNAMENT HANGER

[75] Inventor: Lonnie F. Gary, Lubbock, Tex.

[73] Assignee: Gary Products Group, Inc., Lubbock, Tex.

[21] Appl. No.: 396,518

[22] Filed: Aug. 21, 1989

[51] Int. Cl.$^5$ .............................................. A47H 1/10
[52] U.S. Cl. ..................................... 248/317; 24/532; 248/214
[58] Field of Search ............... 248/317, 340, 339, 214, 248/228, 215, 303; 24/343, 533, 547, 551, 570, 552, 532, 555, 546, 531, 530

[56] References Cited

U.S. PATENT DOCUMENTS

| | | | |
|---|---|---|---|
| 2,885,758 | 5/1959 | Russo et al. | 47/44 X |
| 3,124,856 | 3/1964 | Fleminger | 248/317 X |
| 3,530,545 | 9/1970 | Lengyel | 24/343 X |
| 3,601,862 | 8/1971 | Hargadon | 248/317 X |
| 3,612,461 | 10/1971 | Brown | 248/317 |
| 4,318,525 | 3/1982 | Welch | 248/228 |
| 4,738,424 | 4/1988 | Conner | 248/303 X |

FOREIGN PATENT DOCUMENTS 1522441  4/1968  France ..................... 24/532

Primary Examiner—J. Franklin Foss
Attorney, Agent, or Firm—Ross, Howison, Clapp & Korn

[57] ABSTRACT

A molded plastic hanger is disclosed that is useful for hanging decorative ornaments from the branches of a Christmas tree, wreath, or other similar support member. The subject hanger comprises means for releasably engaging a portion of the hanger around a portion of the decorative ornament and spaced apart means for separately releasably engaging the hanger around a support member. The hanger being further adapted to be engaged and disengaged from the support member by the application of a compressive force to opposed support arms extending between the means for confining the ornament and the means for engaging the support member.

4 Claims, 1 Drawing Sheet

PLASTIC ORNAMENT HANGER

TECHNICAL FIELD

This invention relates to a hanger suitable for use with decorative ornaments, and more particularly, to a molded plastic hanger adapted to suspend a decorative ornament from the branch of a Christmas tree or the like.

BACKGROUND OF THE INVENTION

Many different types of wire and plastic hangers have previously been used for suspending decorative ornaments from limbs, branches or boughs of Christmas trees, wreaths, or the like. In the absence of a hanger specifically intended for the purpose of suspending decorative ornaments, people have often resorted to the use of partially unfolded paper clips and other such devices.

Numerous disadvantages have been encountered in using the conventional decorative ornament hangers previously available. Many of the conventional ornament hangers utilize one hook for engaging a loop on the decorative ornament and another hook at the opposite end of the hanger for engaging the limb or branch from which the ornament is to be suspended. Because the hooks do not form closed loops, ornaments frequently fall and break when accidentally bumped or brushed. This sometimes happens because the ornament becomes disengaged from the hanger, and sometimes happens because the hanger itself becomes disengaged from the limb or branch to which it is attached. In either case, fragile and breakable ornaments are frequently damaged or ruined whenever they fall to the floor.

An additional disadvantage often experienced with hangers used for decorative ornaments is that they become intertangled when stored prior to or between uses.

Still another disadvantage encountered with many metal hangers is that several cutting or bending steps are required for their production, thereby contributing to the complexity and cost of manufacture.

A hanger for decorative ornaments is thereby needed that overcomes the foregoing disadvantages.

SUMMARY OF THE INVENTION

According to the present invention, a hanger for decorative ornaments is provided that can be easily and inexpensively molded from a thermoplastic resin.

The hanger for decorative ornaments disclosed herein is adapted to receive and be releasably fastened around the suspension loop of a decorative ornament. The subject hanger preferably further comprises opposed, recurved overlapping jaws adapted to be separated by the application of a compressive manual force to the hanger so that the jaws can surround and releasably engage the limb, branch or bough to which the hanger is to be attached. The subject hanger preferably further comprises a snap rib and snap rib channel, and a hinge disposed therebetween. Sliding surfaces comprising regions having reduced cross sectional area and substantially planar surfaces adapted to be brought into facing and contacting sliding relationship with each other whenever the snap rib is engaged in the snap rib channel are also preferably provided.

BRIEF DESCRIPTION OF DRAWINGS

The apparatus of the invention is further described and explained in relation to the following figures of the drawings in which.

Like numerals are used to indicate like parts in all figures of the drawing.

DETAILED DESCRIPTION OF THE INVENTION

Figure 1:
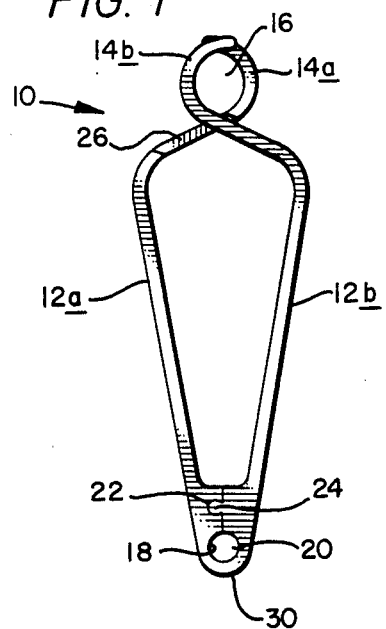
FIG. 1 is an elevation view of the subject hanger when assembled as it would be during use.

Referring to FIGS. 1 through 4, hanger 10 preferably comprises support arms 12a, 12b, connected to recurved jaws 14a, 14b, respectively. Referring to FIG. 1, recurved jaws 14a, 14b cooperate to define void 16 therebetween. When hanger 10 is in use, recurved jaws 14a, 14b preferably encircle the limb, branch, bough or other support member to which hanger 10 is attached.

Hanger 10 preferably further comprises arcuate surface 18, snap rib channel 22, snap rib 24, opposed sliding surfaces 26, 28, and hinge 30.

Hanger 10 is preferably made of a moldable polymeric resin selected from the group consisting of impact acrylic, impact polystyrene, polypropylene, and polyethylene, although it is understood that other resins can also be used satisfactorily provided that any such resin has sufficient flexibility and resilience to function in the manner described below.

Figure 4:
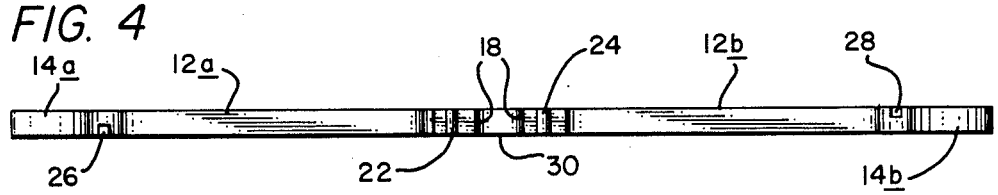
FIG. 4 is a plan view of the subject hanger shown in solid outline in FIG. 3.
Figure 3:
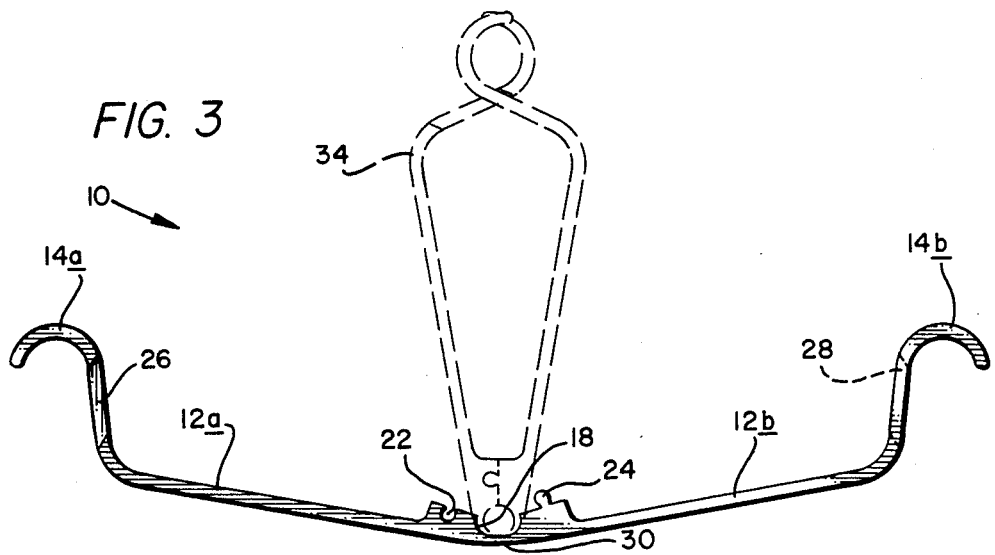
FIG. 3 is an elevation view of the plastic hanger of the invention in the form that it would be manufacture such as by injection molding, with phantom lines depicting the same structure folded and fastened into the position depicted in FIG. 1.

Hanger 10 is preferably injection molded in the form shown in FIGS. 3 and 4. Sliding surfaces 26, 28 preferably comprise regions having reduced cross sectional area and substantially planar surfaces that are adapted to be brought into facing and contacting sliding relationship with each other whenever snap rib 24 is engaged in snap rib channel 22 and support arms 12a, 12b are folded upward around hinge 30 so that recurved jaws 14a, 14b are disposed as shown in phantom in FIG. 3 and in solid outline in FIG. 1. When jaws 14a, 14b are brought into proximity as shown in FIG. 1, they coact to secure ornament hanger 10 to a support member after the support member has been inserted between them by applying compressive force to support arms 12a, 12b against the natural bias of the molded polymeric material from which hanger 10 is made. The application of a compressive force to support arms 12a, 12b causes the free ends of jaws 14a, 14b to separate, permitting the jaws to be extended around the support member. Upon release of the compressive force to support arms 12a, 12b the natural bias of the molded polymeric material causes the free ends of jaws 14a, 14b to overlap again, thereby releasably securing ornament hanger 10 to the support member.

According to a preferred embodiment of the invention, hanger 10 is stored and shipped in the form depicted in FIGS. 3 and 4. At the point of use, a support loop attached to a decorative ornament is slipped over recurved jaw 14a, sliding surface 26, support arm 12a and snap rib channel 22, so that the support loop rests on arcuate surface 18. As referred to herein, the support loop attached to the decorative ornament can be a closed loop of wire, thread, yarn, plastic filament, or the like, as is typically provided for use in attaching decorative ornaments to a limb, branch or other support member. The length of arcuate surface 18 is desirably long enough that the cross-sectional area of void 20 formed when arcuate surface 18 is formed into a cylindrical surface by the insertion of snap rib 24 into snap rib channel 22 is greater than the cross-sectional area of the support loop attached to the decorative ornament.

Alternatively, the support loop of the decorative ornament can be passed over recurved jaw 14b, sliding surface 28, support arm 12b and snap rib 24, although slightly greater clearance in the support loop would be required due to the protrusion of the snap rib 24 which is not encountered if the support loop is started from the opposite side of hanger 10.

In either case, once snap rib 24 is engaged in snap rib channel 22, the decorative ornament support loop is engaged by hanger 10 in such manner that it cannot accidentally become disengaged from hanger 10 by bumping it, brushing up against it, or the like.

As snap rib 24 is engaged in snap rib channel 22, thereby securing the decorative ornament to hanger 10, recurved jaw 14a is simultaneously drawn past recurved jaw 14b, preferably in such manner that sliding surface 26 is in facing and contacting engagement with sliding surface 28. The position in which snap rib 24 and snap rib channel 22 are engaged, and in which no compressive force is being applied to support arms 12a, 12b is shown in FIG. 1. In this position, void 16 is defined by opposed recurved jaws 14a, 14b, and opposed jaws 14a, 14b are preferably fabricated in such manner that, when viewed as shown in FIG. 1, a closed loop is formed by recurved jaws 14a, 14b.

Figure 2:
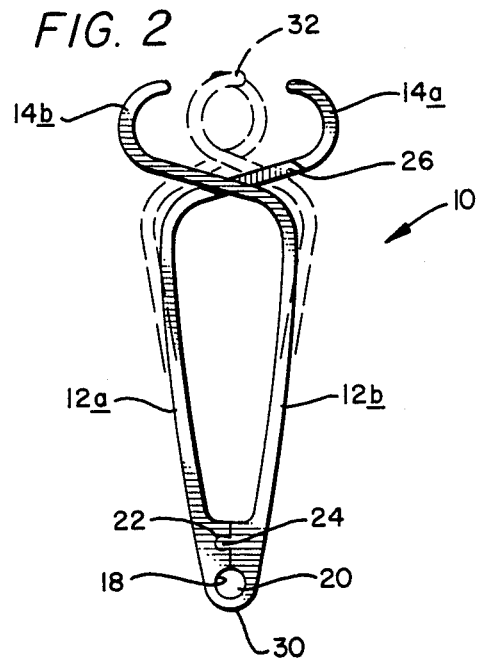
FIG. 2 is an elevation view of the subject hanger in which the opposed, recurved overlapping jaws are separated by the application of a compressive force for attachment to a branch, limb, bough or other support member, with phantom lines showing the alternative position of the jaws upon release of the compressive force.

Whenever support arms 12a, 12b are squeezed together as depicted in FIG. 2, recurved jaws 14a, 14b separate permitting recurved jaws 14a, 14b to be extended around the perimeter of the branch, limb, bough, or other support member to which hanger 10 is to be attached. For this reason, the inwardly facing radii of curvature of recurved jaws 14a, 14b should desirably be sufficient to encircle the entire perimeter of the support member to which hanger 10 is attached and the distance between the outward extending ends of recurved jaws 14a, 14b should be greater than the diameter of the support member whenever support arms 12a, 12b are compressed by the user, thereby permitting the support member to which hanger 10 is to be attached to be admitted between jaws 14a, 14b. Upon release of the compressive force applied to support arms 12a, 12b, hanger 10 will desirably flex back to the position shown in phantom in FIG. 2 and in solid outline in FIG. 1.

It will be apparent to one or ordinary skill in the art upon reading the present disclosure that other fastening means can be similarly substituted for snap rib 24 and snap rib channel 22 of the invention, where the effect of such substitution is to similarly confine the support loop of a decorative ornament within hanger 10.

Likewise, other functionally equivalent structures can be substituted for recurved jaws 14a, 14b without departing from the scope of the invention. For this reason, it is intended that the scope of the invention be limited only by the broadest interpretation of the appended claims to which the inventor is legally entitled.

I claim:

1. A molded polymeric hanger adapted to hang a decorative ornament provided with a suspension loop from a support member, the hanger comprising:
   first and second support arms;
   a hinge joining the support arms at one end thereof;
   first and second recurved end portions connected to the support arms opposite the hinged end;
   the first and second support arms respectively comprising first and second fastening means proximal to the hinge, said first and second fastening means being adapted to releasably engage each other whenever the first and second support arms are folded around the hinge;
   said first and second fastening means and said hinge cooperating to define a closed loop at the hinge end of said support arms whenever the support arms are folded around the hinge and the first and second fastening means are releasably engaged;
   said closed loop being sufficiently large to surround the support loop of the decorative ornament and being adapted to confine the support loop at the hinge end of the support arms;
   said recurved end portions being adapted to separate sufficiently to admit the support member therebetween whenever a compressive force is applied to the support arms between the fastening means and the recurved end portions, and to surround the support member following release of the compressive force.

2. The hanger of claim 1 wherein the first fastening means is a snap rib and the second fastening means is a snap rib channel.

3. The hanger of claim 1 made of a moldable polymeric resin selected from the group consisting of impact acrylic, impact polystyrene, polypropylene, and polyethylene.

4. The hanger of claim 1 wherein the support arms each further comprise a sliding surface proximal to the recurved end portion, the sliding surface having a reduced cross sectional area and a substantially planar surface, the sliding surface of the first support arm being adapted to be brought into facing and contacting sliding relationship with the sliding surface of the second support arm whenever the first and second fastening means are engaged.

* * * * *